United States Patent [19]

Bell

[11] 4,092,926
[45] June 6, 1978

[54] MECHANICAL ROLAMITE IMPACT SENSOR

[75] Inventor: Lon E. Bell, Altadena, Calif.

[73] Assignee: Technar, Incorporated, Arcadia, Calif.

[21] Appl. No.: 751,859

[22] Filed: Dec. 17, 1976

[51] Int. Cl.² .......................... G01P 15/02; F42C 1/00
[52] U.S. Cl. .................................... 102/204 R; 73/514
[58] Field of Search ................. 73/503, 492, 514, 515, 73/516 R, 517 R; 200/61.45 R, 61.53, 61.5; 102/71, 72, 73

[56] References Cited

U.S. PATENT DOCUMENTS

| | | | |
|---|---|---|---|
| 3,226,504 | 12/1965 | Gallistel et al. | 200/61.53 |
| 3,407,667 | 10/1968 | Doeringsfeld | 73/492 |
| 3,512,498 | 5/1970 | Luebke | 73/492 X |
| 3,581,577 | 6/1971 | Ray et al. | 73/492 |
| 3,812,726 | 5/1974 | Bell | 73/514 X |

Primary Examiner—James J. Gill
Attorney, Agent, or Firm—Roger H. Criss

[57] ABSTRACT

A mechanical sensor, operable without any source of electrical energy, includes: a rolamite means, a support means for the rolamite means, a trigger means, a hammer means, a primer means and a biasing means. The rolamite means is responsive to acceleration or deceleration above a predetermined amount and is mounted on the support means. The support means provides a path of movement for a portion of the rolamite means during deceleration. The trigger means is located adjacent to the support means and has a first portion and a second portion. The first portion of the trigger means extends into the path of movement for a portion of the rolamite means. The hammer means is located adjacent to the trigger means and is releasable by the trigger means. The primer means is activated by the hammer. The biasing means biases the hammer means toward the primer means.

12 Claims, 2 Drawing Figures

MECHANICAL ROLAMITE IMPACT SENSOR

BACKGROUND OF THE INVENTION

The present invention relates to a mechanical rolamite sensor, such as for sensing change in acceleration or deceleration. The sensor may be used in a wide variety of applications, such as in a vehicle safety system. For example, the sensor may be used to cause inflation of an air bag in a vehicle when the vehicle is subjected to deceleration above a predetermined amount.

Other designs of deceleration sensors or related apparatus are disclosed in the following U.S. Pat. Nos. 3,812,726; 3,688,063; RE 28,251 and 3,889,232 to L. Bell; 3,452,175; 3,452,309; 3,471,688; and 3,572,141 to D. Wilkes; and 3,567,881 to F. Dulmstra; and in U.S. patent applications Ser. No. 751,880 of L. Bell and Ser. No. 751,858 of L. Bell et al., both filed on the same day as the present application.

SUMMARY OF THE INVENTION

The present invention relates to a mechanical sensor, which operates without any source of electrical energy. The sensor includes: a rolamite means, a support means for the rolamite means; a trigger means, a hammer means, a primer means and a biasing means for the hammer means. The rolamite means is responsive to acceleration or deceleration above a predetermined amount. The rolamite means is mounted on and supported by the support means. The support means provides a path of movement for portion of the rolamite means during deceleration above such predetermined amount. The trigger means is located adjacent to the support means and a portion of the trigger means extends into the path of movement for a portion of the rolamite means. The hammer means is located adjacent to the trigger means and is releasable by the trigger means. The primer means is activated by the hammer. The biasing means biases the hammer means toward the primer means.

DETAILED DESCRIPTION

Figure 1:
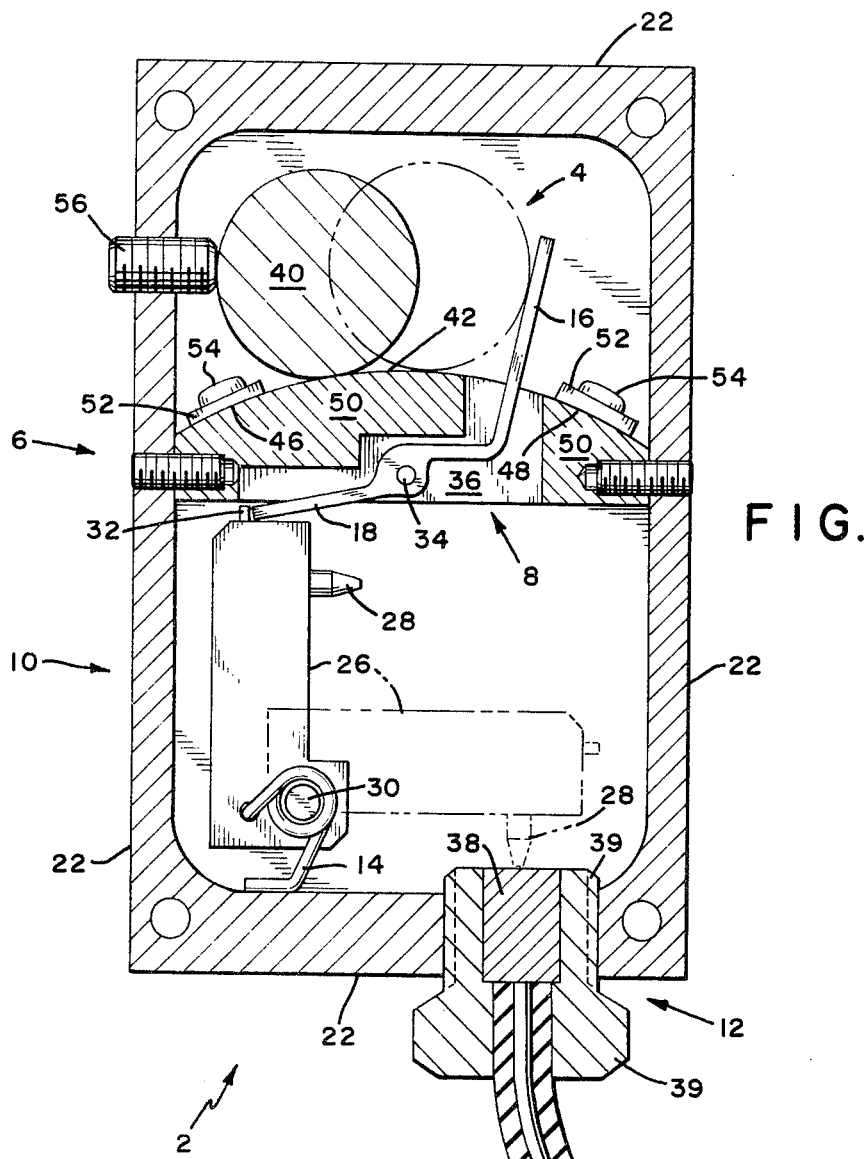
FIG. 1 is a vertical cross-section of the mechanical sensor of the present invention.

Referring to FIG. 1, the mechanical sensor of the present invention, referred to generally by the numeral 2, includes: a rolamite means 4, a support means 6 for the rolamite means 4, a trigger means 8, a hammer means 10, a primer means 12 and a biasing means 14 for the hammer means 10.

The rolamite means 4 is responsive to acceleration or deceleration above a predetermined amount. The rolamite means 4 is mounted on and supported by the support means 6. The support means 6 provides a guide for a path of movement for a portion of the rolamite means 4 during acceleration or deceleration above a predetermined amount. The trigger means 8 is located adjacent to the support means 6 and has a first portion 16 and a second portion 18. The first portion 16 of the trigger means 18 extends into the path of movement for a portion of the rolamite means 4. The hammer means 10 is located adjacent to the trigger means 8 and is releasable by an end of the second portion 18 of the trigger means 8. The primer means 12 is connected to the device to be actuated, such as pyrotechnic device 20 for inflating an air bag. The primer means 12 is activated by the hammer means 10. The biasing means 14 biases the hammer means 10 toward the primer means 12.

The mechanical sensor 2 further includes a housing 22 and an energy transfer means 24. The housing 22 encloses the rolamite means 4, the support means 6, the trigger means 8, the hammer means 10, and the biasing means 14, and at least a portion of the primer means 12. The energy transfer means 24 conveys energy from the primer means 12 to the pyrotechnic device 20.

The hammer means 10 includes: a hammer member 26, a firing pin 28, a hammer pivot point 30 and a stop member 32 for engaging the trigger means 8. The hammer member 26 may have an elongated structure. The firing pin 28 is located adjacent to a first end of the hammer member 26 and the hammer pivot point 30 is located adjacent to an opposing, second end of the hammer member 26.

The trigger means 8 includes: a trigger pivot point 34 located between the first portion 16 and the second portion 18. The first portion 16 extends through an aperture 36 in the support member 6 and extends into the path along which a portion of the rolamite means 4 moves. The second portion 18 of the trigger means 8 extends to the first end of the hammer member 26. Before actuation of the mechanical sensor 2 by deceleration of a predetermined amount, the end of the second portion 18 of the trigger means 8 holds the first end of the hammer member 26 and other portions of the hammer means 10 in their nonactuated position, shown in solid line in FIG. 1. The second portion 18 of the trigger means 8 holds the hammer member 26 in its nonactuated position by engaging the stop means 32 on the hammer member 26.

The primer means 12 may include: a pyrotechnic primer 38 and a holder 39 for the pyrotechnic primer 38. The pyrotechnic primer 38 is activated by the firing pin 28 of the hammer means 10 when the hammer member 26 moves from its non-actuated position shown in solid line in FIG. 1, to its actuated position, shown in dash lines in FIG. 1.

Figure 2:
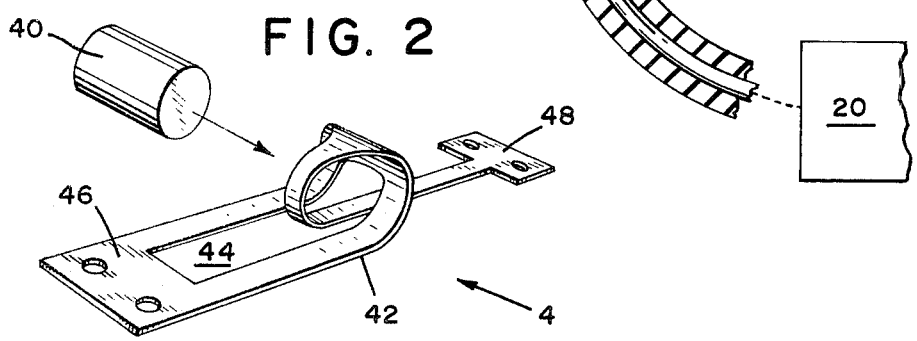
FIG. 2 is a perspective view of the rolamite means, which is a component shown in FIG. 1.

Referring to FIG. 2, the rolamite means 4 includes a movable mass and a band 42 looped around the mass 40. The band 42 is made of a material, such as stainless steel, beryllium-copper or other suitable flat resilient material. The band 42 has a cut-out portion 44 to enable it to be wrapped around the mass 40. The mass 40 may be either solid or hollow and may be constructed of a metal or plastic material. The mass 40 may be in the shape of a cylinder which facilitates rolling movement when deceleration reaches a predetermined amount. The band 42 is looped around the mass 40 so that the ends 46 and 48 extend in opposite directions. Each of the ends 46 and 48 is fixed to the support means 6. When the band 42 is tightly drawn around the mass 40 and secured to the support means 6, it provides a resisting force against which the mass 40 moves in response to acceleration or deceleration above a predetermined amount.

Referring to FIG. 1, the support means 6 includes a support member 50 and two band retainers 52. Each end of the band 42 is positioned between a retainer 52 and the support member 50. A fastening means 54 attaches each retainer 52 and each end of the band 42 at an end of the support member 50. The support member 50 has a top surface which has a curved convex configuration. The mechanical sensor 2 further includes a calibration means 56 which is a screw extending through the housing 22 to the mass 40 of the rolamite means 4 to adjust the non-actuated position of the mass 40, shown in solid line in FIG. 1.

In operation, an acceleration or deceleration force moves the mass 40 to its actuated position, shown in dashed line in FIG. 1. The mass 40 pivots the first portion 16 of the trigger means 8 clockwise, releasing the hammer means 10. The firing pin 28 actuates the primer 38.

Energy generated by combustion of the primer 38 is transmitted by the energy transfer 24 to the pyrotechnic device 20. The energy activates the pyrotechnic device which produces an inflating gas for inflating an air bag. An example of an air bag system in which the sensor 2 of the present invention may be used is described in U.S. patent application Ser. No. 751,858.

The energy transferred from primer 28 through the energy transfer means may also be used to actuate a variety of other devices other than a pyrotechnic device 20.

What is claimed is:

1. A mechanical sensor operable without any source of electrical energy comprising:

a rolamite means responsive to acceleration or deceleration above a predetermined amount;

a support means upon which said rolamite means is mounted for supporting said rolamite means and providing a path of movement for a portion of said rolamite means during said acceleration or deceleration above a predetermined amount;

a trigger means located adjacent to said support means, said trigger means comprising a first portion extending into said path of movement of a portion of said rolamite means, a second portion which extends to a hammer means and a pivot point located between said first and second portions, said trigger means being movable in response to movement of said rolamite means as a result of said acceleration or deceleration;

said hammer means located adjacent to said trigger means and releasable by said second portion of said trigger means upon movement of said trigger means;

a primer means activated by said hammer means;

a biasing means for moving said hammer means towards said primer means, to activate said primer means as a result of said acceleration or deceleration; and a housing for enclosing said rolamite means, said support means, said trigger means, said hammer means, and said biasing means.

2. The mechanical sensor according to claim 1 wherein said hammer means comprises: a hammer member, a pivot point upon which said hammer member pivots, a firing pin for activating said primer means, and a stop member for engaging said trigger means.

3. The mechanical sensor according to claim 1 wherein said primer means comprises: a pyrotechnic primer, and a holder for said pyrotechnic primer.

4. The mechanical sensor according to claim 1 and further comprising an energy transfer means.

5. The mechanical sensor according to claim 1 wherein said rolamite means comprises: a movable mass; and a flexible band looped around said mass, said band having two ends which extend on either side of said mass and are attached to said support means.

6. The mechanical sensor according to claim 1 wherein said support means comprises: a support member having an aperture through which a portion of said trigger means extends; and a band retainer means for retaining said band of said rolamite means.

7. A mechanical sensor operable without any source of electrical energy comprising:

(a) a rolamite means responsive to acceleration or deceleration above a predetermined amount, said rolamite means comprising a single movable mass, and a flexible band looped around said mass;

(b) a support means upon which said rolamite means is mounted and providing a path of movement for said rolamite means during said acceleration or deceleration above a predetermined amount;

(c) a trigger means located adjacent to said support means, said trigger means comprising a first portion which extends into said path of movement of said rolamite means, a second portion which extends to a hammer means and a pivot point located between said first and second portions;

(d) said hammer means located adjacent to said trigger means and releasable by said second portion of said trigger means for movement; said hammer means comprising a hammer member, a pivot point upon which said hammer member pivots, a firing pin for activating a primer means and a stop member for engaging said second portion of said trigger means;

(e) a biasing means for biasing said hammer means towards said primer means;

(f) said primer means connected to a pyrotechnic device and being activated by movement of said hammer means by said biasing means upon release by said second portion of said trigger means, said primer means comprising a pyrotechnic primer and a holder for said pyrotechnic primer; and (g) a housing enclosing said rolamite means, said support means, said trigger means, said hammer means, said biasing means and at least a portion of said primer means.

8. The mechanical sensor of claim 7 wherein said path of movement of said rolamite means in said support member comprising a surface having a curved convex configuration.

9. The mechanical sensor of claim 8 wherein said housing is stationary and said trigger means and said hammer means move with respect to said housing.

10. The mechanical sensor of claim 7 further comprising a calibration means to vary the level of said predetermined amount of acceleration or deceleration.

11. The mechanical sensor of claim 7 wherein said trigger means comprises a lever pivotable adjacent its center and mounted in said support means for pivotable movement upon activation by said rolamite means.

12. The mechanical sensor of claim 7 wherein said rolamite mass comprises a cylinder.

* * * * *